(12) United States Patent
Kim

(10) Patent No.: US 6,972,597 B2
(45) Date of Patent: Dec. 6, 2005

(54) SIMULTANEOUS BIDIRECTIONAL INPUT/OUTPUT CIRCUIT AND METHOD

(75) Inventor: Woo-Seop Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/748,748

(22) Filed: Dec. 29, 2003

(65) Prior Publication Data

US 2004/0184601 A1   Sep. 23, 2004

(30) Foreign Application Priority Data

Dec. 31, 2002  (KR) .......................... 10-2002-87887
Apr. 21, 2003  (KR) .......................... 10-2003-25085

(51) Int. Cl.[7] ........................................ H03K 19/0175
(52) U.S. Cl. ............................ 326/86; 326/30; 326/21; 327/108; 710/100
(58) Field of Search ........................... 376/86, 90, 83, 376/30, 21; 327/108–112; 710/100, 126

(56) References Cited

U.S. PATENT DOCUMENTS

| 5,541,535 | A | 7/1996 | Cao et al. | |
| 5,604,450 | A | 2/1997 | Borkar et al. | |
| 6,127,849 | A | 10/2000 | Walker | |
| 6,348,811 | B1 | 2/2002 | Haycock et al. | |
| 6,453,422 | B1 * | 9/2002 | Dabral et al. | 713/300 |
| 6,639,426 | B2 * | 10/2003 | Haycock et al. | 326/82 |
| 6,791,356 | B2 * | 9/2004 | Haycock et al. | 326/82 |

FOREIGN PATENT DOCUMENTS

KR   2004-26576   3/2004

OTHER PUBLICATIONS

English language abstract of Korean Patent Publication No. 2004-26576, no date.

* cited by examiner

Primary Examiner—Vibol Tan
(74) Attorney, Agent, or Firm—Marger Johnson & McCollom, P.C.

(57) ABSTRACT

Method and apparatus for use with simultaneous bi-directional (SBD) input/output circuits are included among the embodiments. In exemplary systems, the receiver in an SBD circuit compares a bit line voltage to two different voltages representing the two voltages that are expected on the bit line, based on the data that the driver in the SBD circuit is currently driving. Other embodiments are described and claimed.

21 Claims, 10 Drawing Sheets

US 6,972,597 B2

SIMULTANEOUS BIDIRECTIONAL INPUT/OUTPUT CIRCUIT AND METHOD

RELATED APPLICATIONS

This application claims the benefit of Korean Patent Applications No. 2002-87887, filed Dec. 31, 2002 and 2003-25085, filed Apr. 21, 2003, the disclosures of which are hereby incorporated herein by reference.

BACKGROUND OF THE INVENTION

1. Field of the Invention

The present invention relates to semiconductor devices employing simultaneous bi-directional (SBD) transmission, and more particularly to methods and apparatus for SBD input/output circuits for such devices.

2. Description of the Related Art

Semiconductor devices such as processors, controllers, memory devices, etc., are commonly equipped with data transceivers that allow them to receive and transmit digital signals. Conventionally, such transceivers are reconfigurable to either receive or transmit data across an attached transmission line. Recently, devices with simultaneous bi-directional (SBD) transmit/receive capability have received increased interest. As the name alludes to, SBD transceivers have the capability to receive and transmit digital data during the same clock cycle, on the same transmission line.

FIG. 1 shows a conventional SBD connection between two semiconductor devices 20 and 40. Devices 20 and 40 contain, respectively, SBD transceivers 22 and 42. SBD transceiver 22 contains a data driver 24 and a data receiver 26. An internal data signal to be driven, Dout1, is supplied as an input to driver 24 and as a control signal to receiver 26. The output of driver 24 is coupled to the input of receiver 26. Receiver 26 also receives two reference voltages, VrefH and VrefL, which it uses for comparisons, as will be explained shortly. The output of receiver 26 is a data input, Din1, to device 20.

Transceiver 42 of device 40 is preferably matched to transceiver 22 of device 20. Transceiver 42 contains a driver 44 and a receiver 46 connected in an identical configuration as the driver and receiver of transceiver 22. Driver 44 takes its input from an internal data signal Dout2, and receiver 46 generates a data input Din2.

Semiconductor devices 20 and 40 can be connected to each other in the configuration shown in FIG. 1, by connecting the outputs of drivers 24 and 44 to a transmission line 30. Note that in this configuration, the drive state of both driver 24 and driver 44 determine the voltage $V_{BL}$ on transmission line 30. A common reference voltage generator 32 supplies VrefH and VrefL to both circuits.

FIG. 2 contains waveforms illustrating the simultaneous exchange of data between devices 20 and 40 over transmission line 30. Dout1 is high during time periods T1, T2, and T5. Dout2 is high during time periods T1, T3, and T5. Consequently, during T1, drivers 24 and 44 both pull the voltage $V_{BL}$ on the transmission line high, e.g., to an upper rail voltage $V_h$. During T2, driver 24 attempts to pull the voltage $V_{BL}$ high and driver 44 attempts to pull $V_{BL}$ low, e.g., to a lower rail voltage $V_1$. With matched drivers, $V_{BL}$ will assume an approximate voltage $V_{mid}$, halfway between upper rail voltage $V_h$ and the lower rail voltage $V_1$. During T3, both drivers reverse, and $V_{BL}$ stays at $V_{mid}$. During T4, both drivers pull $V_{BL}$ low, to $V_1$.

Receivers 26 and 46 determine the drive state of the other device's driver during each time period by selecting an appropriate comparison voltage, based on the known drive state of their own driver. For instance, during T1 and T2, receiver 26 knows that driver 24 is driving line 30 high—thus the only two possible values of $V_{BL}$ are $V_h$ (when driver 44 is also driving line 30 high) and $V_{mid}$ (when driver 44 is driving line 30 low). Thus during T1, receiver 26 selects the reference voltage VrefH in response to a logic high level on Dout1 and then compares $V_{BL}$, with its high level (Vh), to VrefH, at a level of ¾ $V_{DD}$, and outputs Din1 as a high level. Also, during T2, the receiver 26 also selects the reference voltage VrefH in response to a logic high level on Dout1 and then compares $V_{BL}$, now with a $V_{mid}$ level, to VrefH, at a level of ¾ $V_{DD}$, and outputs Din1 as a low level. During T3, the receiver 26 selects the reference voltage VrefL in response to a logic low level on Dout1 and then compares $V_{BL}$, with its $V_{mid}$ level, to VrefL, at a level of ¼ $V_{DD}$, and outputs Din1 as a high level. Also, during T4, the receiver 26 also selects the reference voltage VrefL of ¼ $V_{DD}$ in response to a logic low level on Dout1 and then compares $V_{BL}$, now with a low level, to VrefL, at a level of ¼ $V_{DD}$, and outputs Din1 as a low level. Receiver 46 operates similarly, but based on the known state of driver 44, to determine the drive state of driver 24.

In some prior art implementations, the reference signals VrefH and VrefL are generated separately on each device. Some receivers use multiplexers, with Dout as a select signal, to decide which of the two reference signals will be compared to $V_{BL}$. Other receivers use a buffer to selectively generate one of VrefH and VrefL for comparison with $V_{BL}$.

In the prior art devices, the SBD receivers compare the voltage $V_{BL}$ to a single reference voltage VrefL or VrefH, representing 0.25 $V_{DD}$ and 0.75 $V_{DD}$, depending on the value of Dout for that SBD device. Referring to FIG. 3A, receiver 26 of FIG. 1 compares $V_{BL}$ to 0.75 $V_{DD}$ during time periods T1, T2, and T5, and compares $V_{BL}$ to 0.25 $V_{DD}$ during time periods T3 and T4. Likewise and as shown in FIG. 3B, receiver 46 compares $V_{BL}$ to 0.75 $V_{DD}$ during time periods T1, T3, and T5, and compares $V_{BL}$ to 0.25 $V_{DD}$ during time periods T2 and T4. Consequently, at each time period the maximum differential voltage applied to each differential receiver is approximately 0.25 $V_{DD}$. This small margin can be readily eroded by noise and driver mismatches, and can also be substantially affected by small errors in the reference voltages VrefL or VrefH, which are not voltages naturally produced by SBD circuits during signaling.

DETAILED DESCRIPTION OF THE EMBODIMENTS

The embodiments described herein seek to replace the single comparison between a voltage on the transmission line and a synthesized 0.25 $V_{DD}$ or 0.75 $V_{DD}$ reference voltage, as practiced in prior art SBD receivers. Succinctly stated, various receiver embodiments described herein use two comparison voltages that each approximate one of the two voltages that could appear on an SBD transmission line.

Figure 1:
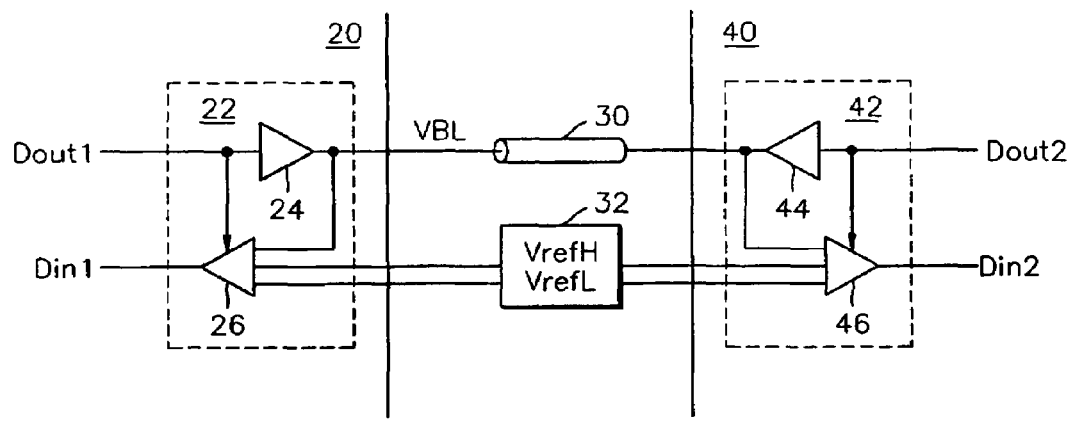
FIG. 1 illustrates two prior-art SBD transceivers, on separate semiconductor devices, connected by a transmission line.
Figure 2:
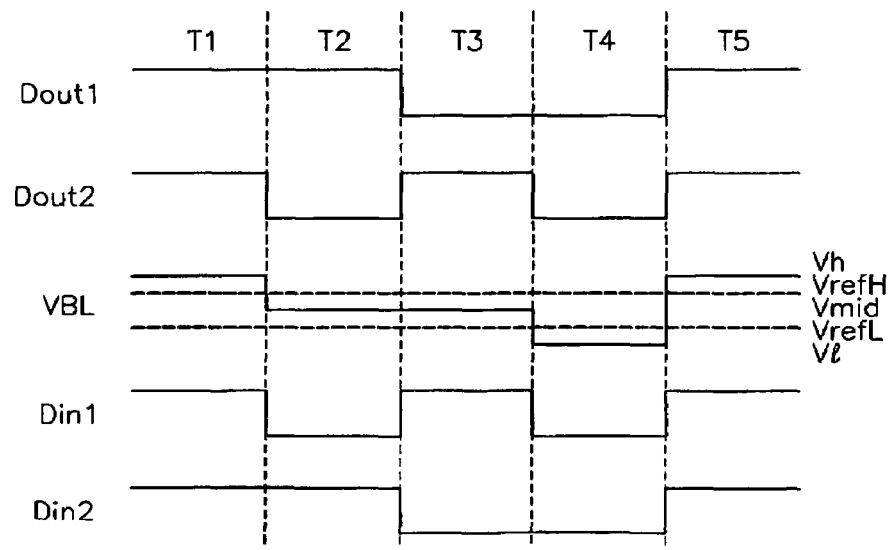
FIG. 2 illustrates data input value/output value relationships for the transceivers of FIG. 1.
Figure 3A:
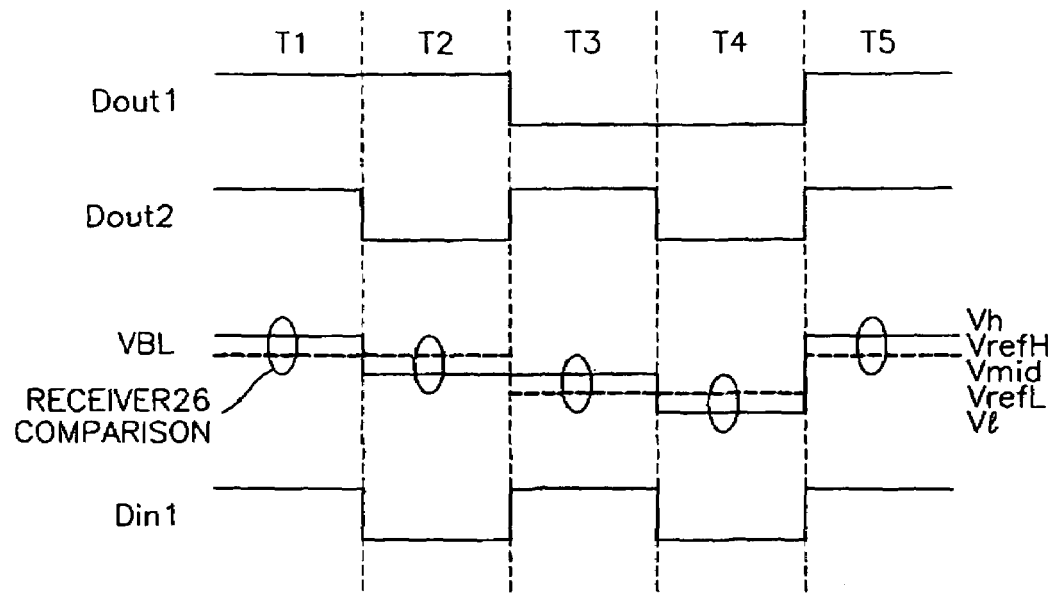
FIGS. 3A and 3B show, respectively, the comparisons made by the two SBD transceivers of FIG. 1 for various driven data states.
Figure 3B:
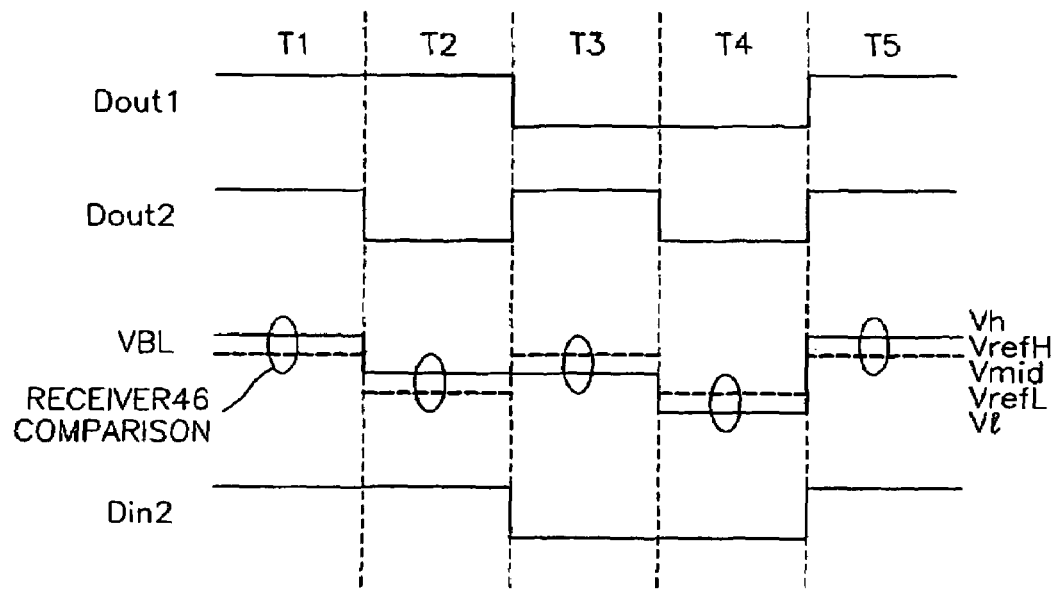
Figure 4:
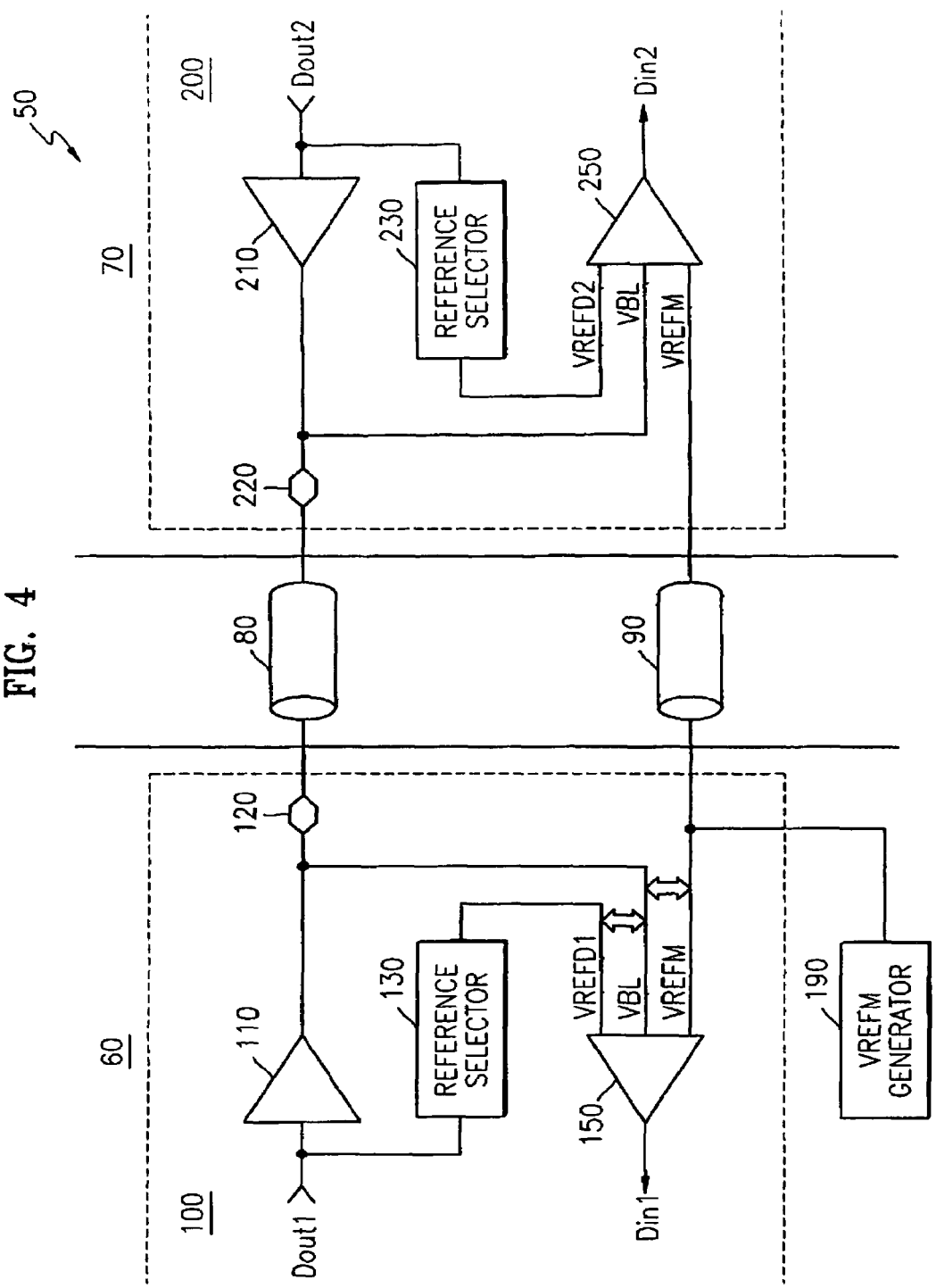
FIG. 4 illustrates two SBD transceivers according to some embodiments of the present invention, connected by a transmission line.

FIG. 4 illustrates a configuration 50 comprising two semiconductor devices 60 and 70 connected by two transmission lines 80 and 90. Device 60 comprises an SBD input/output (I/O) circuit 100, and device 70 comprises an SBD input/output circuit 200. Transmission line 80 connects to an I/O pad 120 of SBD I/O circuit 100 at one end, and to an I/O pad 220 of SBD I/O circuit 200 at the other end. Transmission line 90 connects to a VREFM generator 190 on device 60 in order to supply VREFM to device 70 (alternately, each device can generate its own VREFM reference or the VREFM generator can only be located in the device 70). VREFM generator 190 can also supply VREFM to other SBD I/O circuits (not shown) on either device.

SBD I/O circuit 100 comprises a driver 110, a reference selector 130, and a receiver 150. Driver 110 can operate in a conventional manner to drive an output signal Dout1 through pad 120 onto transmission line 80. Reference selector 130 uses output signal Dout1 to select a first reference voltage VREFD1 for input to receiver 150; VREFM generator 190 supplies a second reference voltage VREFM to receiver 150. A third input to receiver 150 connects to I/O pad 120, and therefore supplies a voltage $V_{BL}$ to receiver 150. As will be explained shortly, receiver 150 uses VREFD1, VREFM, and $V_{BL}$ from transmission line 80 to output a signal Din1 representative of the signal Dout2 signaled by SBD I/O circuit 200.

SBD I/O circuit 200 comprises a driver 210, a reference selector 230, and a receiver 250, configured substantially similarly to the corresponding elements of SBD I/O circuit 100.

The operation of receiver 150 will now be explained with reference to FIG. 5A, with an underlying assumption that drivers 110 and 210 are capable of driving transmission line 80 to three possible voltages $V_{DD}$, $V_{SS}$, and $0.5(V_{DD-VSS})$. To simplify the discussion, $V_{SS}=0$ V will be assumed, although those skilled in the art recognize that other values of $V_{SS}$ can be selected in a particular implementation, and voltages $V_{DD}$ and $V_{SS}$ may not represent full rail voltages in other implementations due to driver limitations.

During time periods T1 and T2, Dout1 is a logic high value, and therefore the two possible expected values of $V_{BL}$ are $V_{DD}$ and $V_{DD}/2$. VREFM generator 190 sets VREFM to $V_{DD}/2$, and reference selector 130 sets VREFD1 to $V_{DD}$, because the level of Dout1 is a high level. In other words, if the level of Dout1 is a low level, the reference selector 130 sets VREFD1 to $V_{SS}$. The reference selector 230 operates the same as reference selector 130. Receiver 150 thus compares $V_{BL}$ to $V_{DD}$ and $V_{DD}/2$, setting Din1 to a logic high value when $V_{BL}$ is closer to $V_{DD}$ (time period T1) and setting Din1 to a logic low value when $V_{BL}$ is closer to $V_{DD}/2$ (time period T2).

During time periods T3 and T4, Dout1 is a logic low value, and therefore the two possible expected values of $V_{BL}$ are $V_{DD}/2$ and $V_{SS}$. Accordingly, reference selector 130 sets VREFD1 to $V_{SS}$. Receiver 150 thus compares $V_{BL}$ to $V_{DD}/2$ and $V_{SS}$, setting Din1 to a logic high value when $V_{BL}$ is closer to $V_{DD}/2$ (time period T3) and setting Din1 to a logic low value when $V_{BL}$ is closer to $V_{SS}$.

Figure 5A:
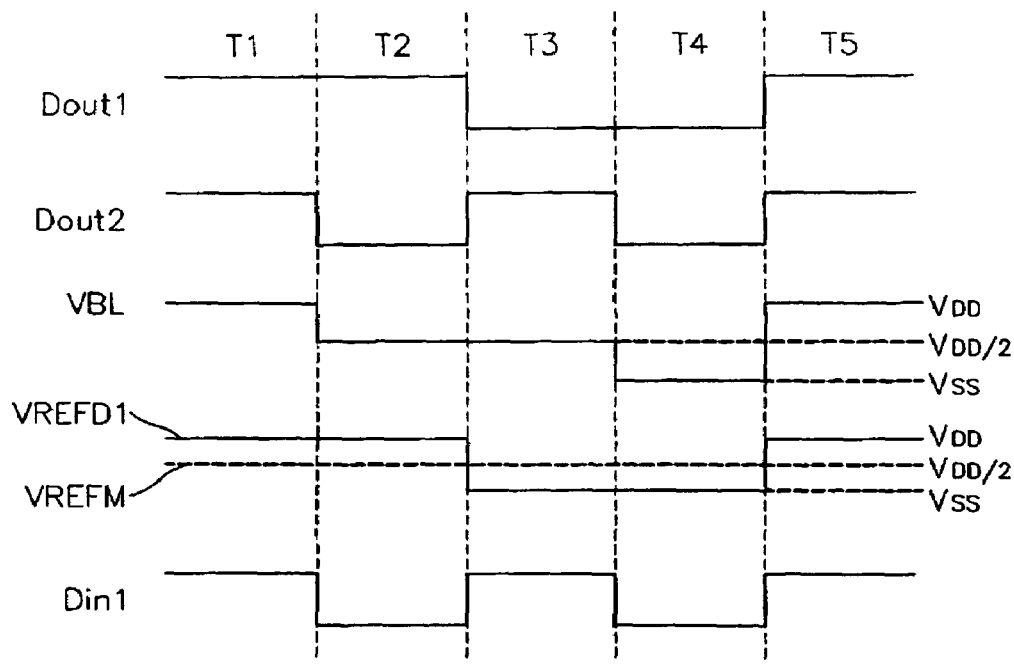
FIGS. 5A and 5B depict, respectively, the comparisons made by the two SBD transceivers of FIG. 4 for various driven data states.
Figure 5B:
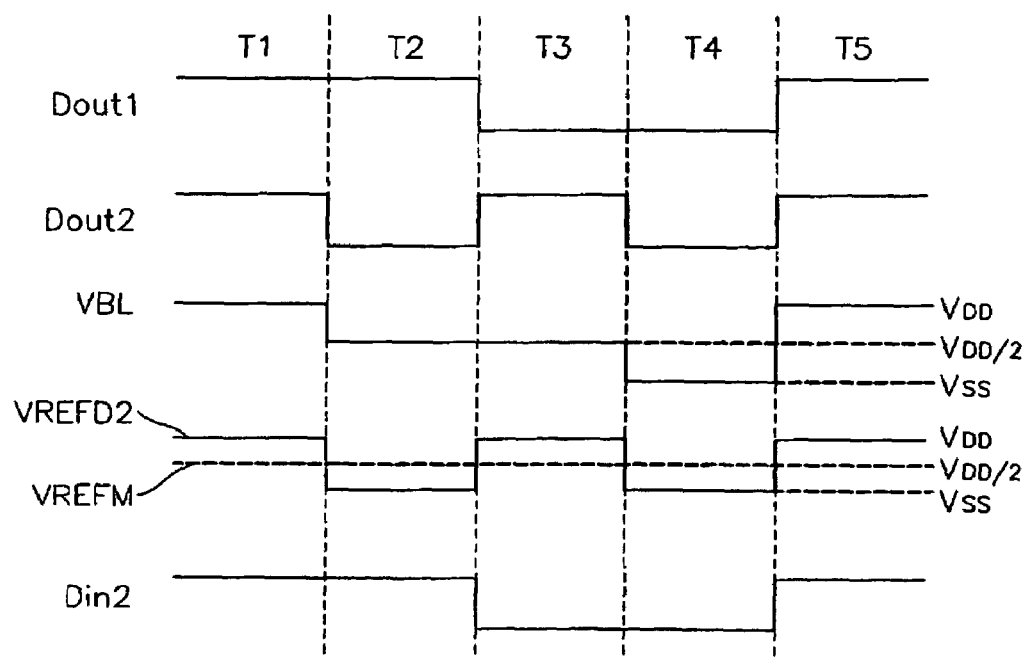

FIG. 5B illustrates the similar operation of SBD I/O circuit 200 for the same Dout1/Dout2 drive sequence.

Figure 6:
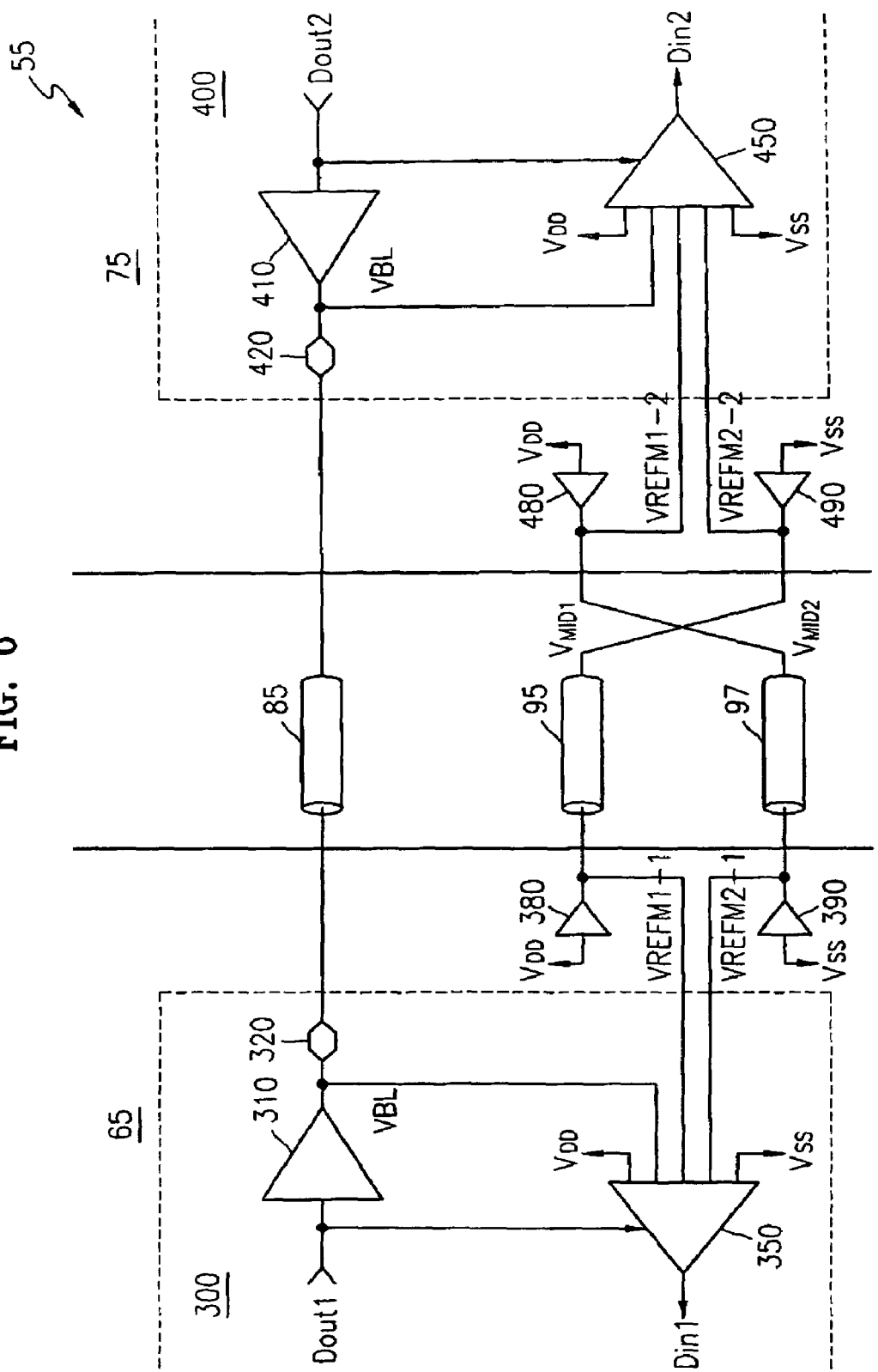
FIG. 6 illustrates two SBD transceivers according to other embodiments of the present invention, connected by a transmission line.

FIG. 6 illustrates a configuration 55 comprising two semiconductor devices 65 and 75 connected by three transmission lines 85, 95 and 97. Device 65 comprises an SBD input/output (I/O) circuit 300, a VREFM1-1 generator 380, and a VREFM2-1 generator 390. Device 75 comprises an SBD input/output circuit 400, a VREFM1-2 generator 480, and a VREFM2-2 generator 490. Transmission line 85 connects to an I/O pad 320 of SBD I/O circuit 300 at one end, and to an I/O pad 420 of SBD I/O circuit 400 at the other end. Transmission line 95 connects VREFM1-1 generator 380 on device 65 to VREFM2-2 generator 490 on device 75. Transmission line 97 connects VREFM2-1 generator 390 on device 65 to VREFM1-2 generator 480 on device 75.

SBD I/O circuit 300 comprises a driver 310 and a receiver 350 that functionally incorporates an internal reference selector. Driver 310 can operate in a conventional manner to drive an output signal Dout1 through pad 320 onto transmission line 85. Receiver 350 receives output signal Dout1, which it uses to operate a corresponding portion of the receiver. Five comparison voltages are supplied to receiver 350: rail voltages $V_{DD}$ and $V_{SS}$, voltage $V_{BL}$, and voltages VREFM1-1 and VREFM2-1 generated respectively by reference generators 380 and 390. As will be explained shortly, receiver 350 uses these voltages to output a signal Din1 representative of the signal Dout2 signaled by SBD I/O circuit 400.

SBD I/O circuit 400 comprises a driver 410 and a receiver 450 configured substantially similarly to the corresponding elements of SBD I/O circuit 300.

The use of two mid-point reference voltages VREFM1 and VREFM2 on each device accounts for the possibility that drivers 310 and 410 may not be perfectly matched. In such a circumstance, slightly different voltages $V_{BL}$ are observed when driver 310 attempts to pull the line high and driver 410 attempts to pull the line low, compared to when driver 310 attempts to pull the line low and driver 410 attempts to pull the line high (see FIG. 7A, voltages $V_{MID1}$ and $V_{MID2}$ for $V_{BL}$ during time periods T2 and T3, respectively). To increase the accuracy of the receiver operation, two different midpoint voltages are calculated and used in these two situations.

Generator 380 is matched to driver 310—or at least to the pull-up portion of driver 310—and has an input tied permanently to $V_{DD}$ (or possibly a logic high signal) in one embodiment. In operation, then, generator 380 is always attempting to pull line 95 high with the same strength that driver 310 attempts to pull line 85 high when Dout1 is a logic high value.

Generator 490 is matched to driver 410—or at least to the pull-down portion of driver 410—and has an input tied permanently to $V_{SS}$ (or possibly to a logic low signal) in one embodiment. In operation, then, generator 490 is always attempting to pull line 95 low with the same strength that driver 410 attempts to pull line 85 low when Dout2 is a logic low value.

When generators 380 and 490 are connected by transmission line 95, a VREFM1-1 value is supplied to receiver 350 that should accurately match $V_{BL}$ when Dout1 is a logic high value and Dout2 is a logic low value, even if drivers 310 and 410 are not perfectly matched. The same value is supplied to receiver 450 as VREFM2-2.

Generators 390 and 480 are constructed similar to their respective counterparts 490 and 380 and are connected in operation by transmission line 97. Accordingly, a VREFM2-1 value is supplied to receiver 350 that should accurately match $V_{BL}$ when Dout1 is a logic low value and Dout2 is a logic high value, even if drivers 310 and 410 are not perfectly matched. The same value is supplied to receiver 450 as VREFM1-2.

Figure 7A:
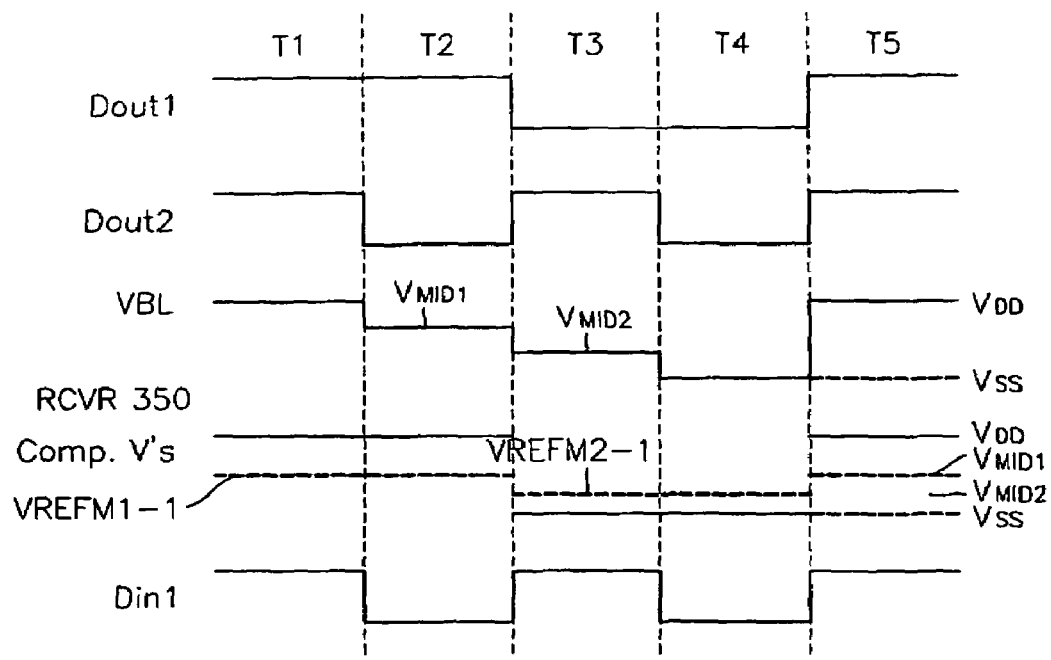
FIGS. 7A and 7B depict, respectively, the comparisons made by the two SBD transceivers of FIG. 6 for various driven data states.
Figure 7B:
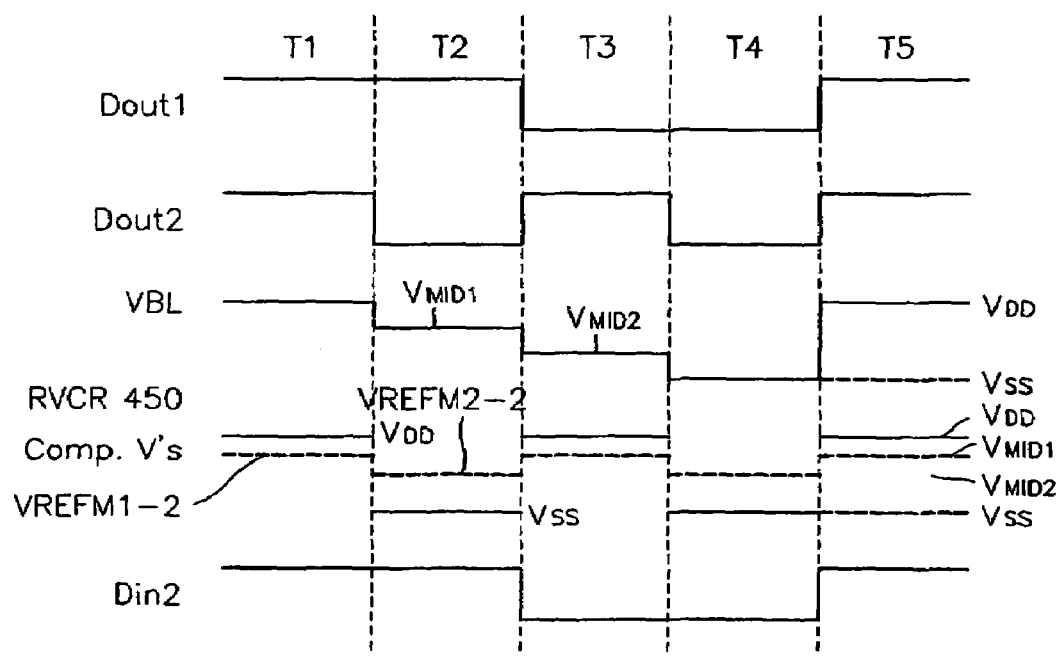

The operation of receivers 350 and 450 can be better understood with reference to FIGS. 7A and 7B. Referring first to FIG. 7A, during time periods T1 and T2, Dout1 is a logic high value, and therefore the two possible expected values of $V_{BL}$ are $V_{DD}$ and $V_{MID1}$. Accordingly, receiver 350 activates a portion of its circuitry that compares $V_{BL}$ to $V_{DD}$ and VREFM1-1, setting Din1 to a logic high value when $V_{BL}$ is closer to $V_{DD}$ (time period T1) and setting Din1 to a logic low value when $V_{BL}$ is closer to $V_{MID1}$ (time period T2).

During time periods T3 and T4, Dout1 is a logic low value, and therefore the two possible expected values of $V_{BL}$ are $V_{MID2}$ and $V_{SS}$. Accordingly, receiver 350 activates a portion of its circuitry that compares $V_{BL}$ to $V_{MID2}$ and $V_{SS}$, setting Din1 to a logic high value when $V_{BL}$ is closer to $V_{MID2}$ (time period T3) and setting Din1 to a logic low value when $V_{BL}$ is closer to $V_{SS}$.

FIG. 7B shows a similar selection of comparison voltages for receiver 450. Because driver 410 drives opposite of driver 310 when $V_{BL}$ is equal to $V_{MID1}$ or $V_{MID2}$, however, the voltage values supplied to receiver 450 as VREFM1-2 and VREFM2-2 are switched from the corresponding values in FIG. 7A.

FIG. 8A contains a circuit diagram for some embodiments of a receiver 150 (or 250) as shown in FIG. 4. The receiver comprises two differential amplifiers 151 and 153 and a load circuit 155.

Load circuit 155 comprises first and second matched load resistors $R_L$. One end of each resistor is connected to $V_{DD}$. The other end of the first resistor connects to a differential output node OUT; the other end of the second resistor connects to a second differential output node OUTB. An output stage (not shown) converts the voltage difference appearing across OUT and OUTB to a logic signal Din.

Differential amplifier 151 contains two matched depletion-mode N-channel MOSFET transistors N1 and N2, and a third N-channel MOSFET transistor N3. Transistor N3 has a drain connected to a tail current node, a source connected to $V_{SS}$, and a gate connected to an input node BIAS. BIAS is set by a biasing circuit (not shown) that sets the tail current $I_A$ flowing from the tail current node through transistor N3, such that N3 acts as a current source for differential amplifier 151.

The sources of matched transistors N1 and N2 connect to the tail current node and therefore split tail current $I_A$ according to the differential voltage applied to their gates. The gate of transistor N1 receives the signal VREFM from VREFM generator 190 (FIG. 4), and the gate of transistor N2 receives the voltage signal $V_{BL}$. The drain of N1 connects to output node OUT, and the drain of N2 connects to output node OUTB.

Differential amplifier 153 is identical to differential amplifier 151. Differential amplifier 153 contains two matched depletion-mode N-channel MOSFET transistors N4 and N5, and a third N-channel MOSFET transistor N6. Transistor N6 has a drain connected to a tail current node, a source connected to $V_{SS}$, and a gate connected to the input node BIAS. BIAS sets the tail current $I_B$ flowing from the tail current node through transistor N6, such that N6 acts as a current source for differential amplifier 153 and $I_A = I_B$.

The sources of matched transistors N4 and N5 connect to the tail current node and therefore split tail current $I_B$ according to the differential voltage applied to their gates. The gate of transistor N4 receives the voltage signal $V_{BL}$, and the gate of transistor N5 receives the signal VREFD1 from reference selector 130 (FIG. 4). The drain of N5 connects to output node OUT, and the drain of N4 connects to output node OUTB.

Because differential amplifiers 151 and 153 both connect to load circuit 155, both tail current $I_A$ and tail current $I_B$ must flow from positive voltage rail $V_{DD}$ through load circuit 155. The combined current $I_A + I_B$ is split between the two load resistors depending on the values of VREFM, VREFD1, and $V_{BL}$. For example, consider the conditions shown during time period T1 in FIG. 5A, wherein $V_{BL} = \text{VREFD1} = V_{DD}$ and $\text{VREFM} = V_{DD}/2$. Under these conditions N2 will be driven harder than N1 and carry more than half of $I_A$, thus dropping the voltage at OUTB as compared to OUT. N4 and N5 will be driven approximately the same and will split $I_B$ equally, and thus no differential voltage will appear across OUT/OUTB as a result of amplifier 153. The net effect is a positive differential voltage between OUT and OUTB, indicating that Din should be set to a logic high condition.

For time period T2 of FIG. 5A, VREFD1 remains at $V_{DD}$ and VREFM remains at $V_{DD}/2$, but $V_{BL}$ drops to $V_{DD}/2$. Accordingly, N1 and N2 will be driven approximately the same and will split $I_A$ equally, and thus no differential voltage will appear across OUT/OUTB as a result of amplifier 151. N5 will be driven harder than N4, however, and carry more than half of $I_B$, thus dropping the voltage at OUT as compared to OUTB. The net effect is a negative differential voltage between OUT and OUTB, indicating that Din should be set to a logic low condition.

Continuing with time period T3 of FIG. 5A, $V_{BL} = \text{VREFM} = V_{DD}/2$, but reference selector 130 now sets VREFD1 to $V_{SS}$. Accordingly, N1 and N2 will be driven approximately the same and will split $I_A$ equally, and thus no differential voltage will appear across OUT/OUTB as a result of amplifier 151. N4 will be driven harder than N5, however, and carry more than half of $I_B$, thus dropping the voltage at OUTB as compared to OUT. The net effect is a positive differential voltage between OUT and OUTB, indicating that Din should be set to a logic high condition.

Finally, consider time period T4 of FIG. 5A, when VREFD1 remains at $V_{SS}$ and VREFM remains at $V_{DD}/2$, but $V_{BL}$ drops to $V_{SS}$. Under these conditions N1 will be driven harder than N2 and carry more than half of $I_A$, thus dropping the voltage at OUT as compared to OUTB. N4 and N5 will be driven approximately the same and will split $I_B$ equally, and thus no differential voltage will appear across OUT/OUTB as a result of amplifier 153. The net effect is a negative differential voltage between OUT and OUTB, indicating that Din should be set to a logic low condition.

Several features of this embodiment are evident. First, the two differential amplifiers nominally complement each other—when one receives a differential input voltage, the other does not, and therefore both can drive the same load circuit to create a common output. Second, the reference values all correspond to values generated on transmission line 80, which can therefore be generated fairly accurately. Third, the differential input voltage that is nominally amplified is 0.5 $V_{DD}$, whereas the prior art single-amplifier configurations amplify a 0.25 $V_{DD}$ differential signal for the same voltage.

Figure 8:
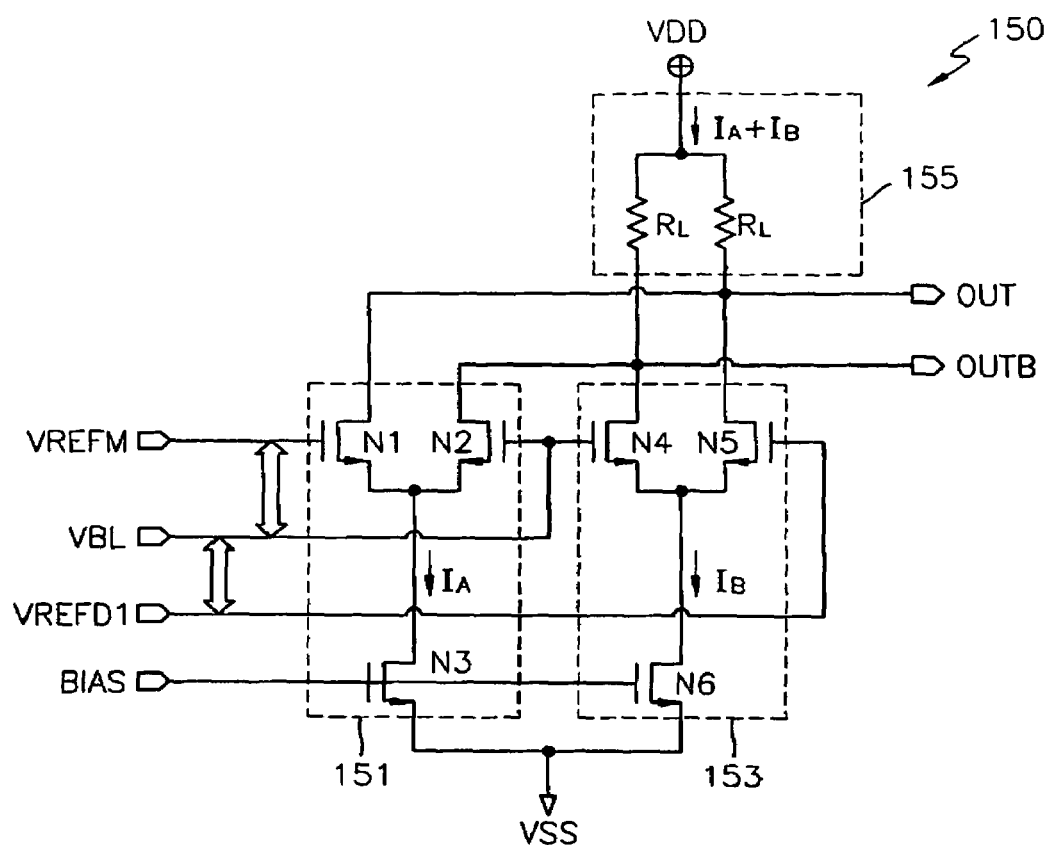
FIGS. 8 and 9 illustrate, respectively, a receiver circuit and reference selector useful in some embodiments of the present invention.

For low-voltage signaling, the embodiment of FIG. 8 is particularly useful because it uses larger differential input voltages and therefore has a superior noise margin. For instance, consider a case where $V_{DD}$=1 V and $V_{SS}$=0 V and two drivers are both trying to drive $V_{BL}$ to $V_{DD}$, but because of noise or other effects $V_{BL}$=0.8 V. A prior art receiver would compare $V_{BL}$=0.8 V to VREFH=0.75 V and attempt to sense a logic high signal from a 0.05 V differential voltage. Receiver 150, on the other hand, would amplify a 0.3 V differential signal in differential amplifier 151, and an opposing –0.2 V differential signal in differential amplifier 153, which is equivalent to amplifying a 0.1 V differential voltage in a prior art receiver. Thus receiver 150 has twice the noise margin of a prior art receiver.

Figure 9:
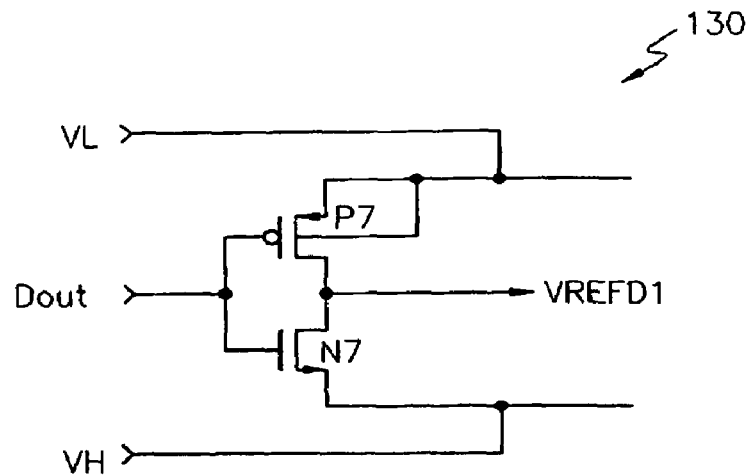

FIG. 9 illustrates one embodiment for reference selector 130 of FIG. 4. A low voltage VL is applied to the source of a P-channel MOSFET transistor P7, and a high voltage VH is applied to the source of an N-channel MOSFET transistor N7. The drains of transistors P7 and N7 are both connected to supply VREFD1, the output of reference selector 130. The gates of transistors P7 and N7 are both connected to DOUT1. When DOUT1 is a logic high signal, VH is passed as VREFD1, and when DOUT1 is a logic low signal, VL is passed as VREFD1. VL and VH may be adjusted if necessary to account for the threshold voltages of P7 and N7 such that VREFD1 approximate high and low voltages.

Figure 10:
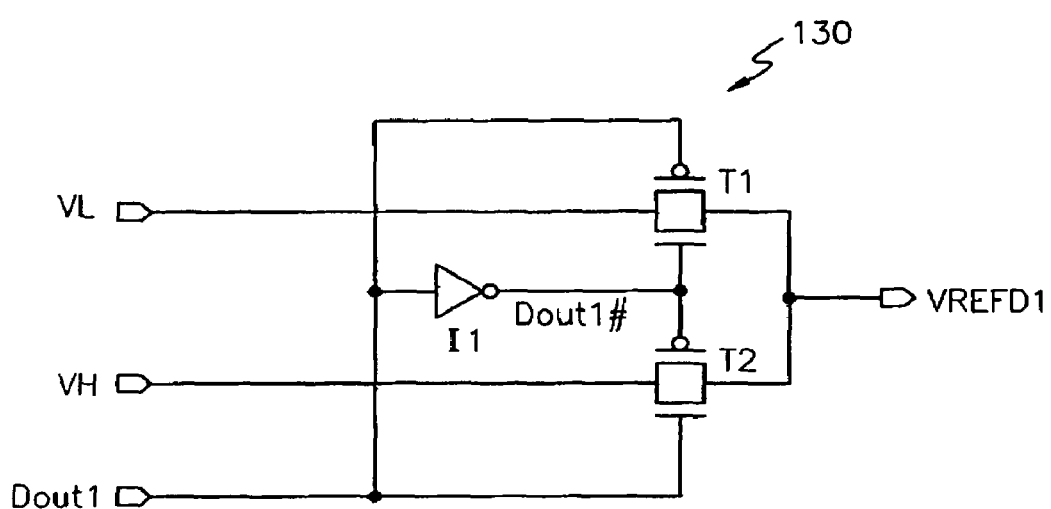
FIG. 10 shows an alternate embodiment of a reference selector.

FIG. 10 illustrates a second embodiment for reference selector 130 of FIG. 4. Two transmission gates T1 and T2 are both connected to VREFD1, the output of reference selector 130. A low voltage VL is connected to the input of T1, and a high voltage VH is connected to the input of T2. DOUT1 is connected to the input of an inverter I1, which generates the logical inverse of DOUT1, DOUT1#. DOUT1 and DOUT1# are applied to the control gates of transmission gate T1 such that T1 is on when DOUT1 is logic low. DOUT1 and DOUT1# are applied to the opposite control gate terminals of transmission gate T2 such that T2 is on when DOUT1 is logic high.

Figure 11:
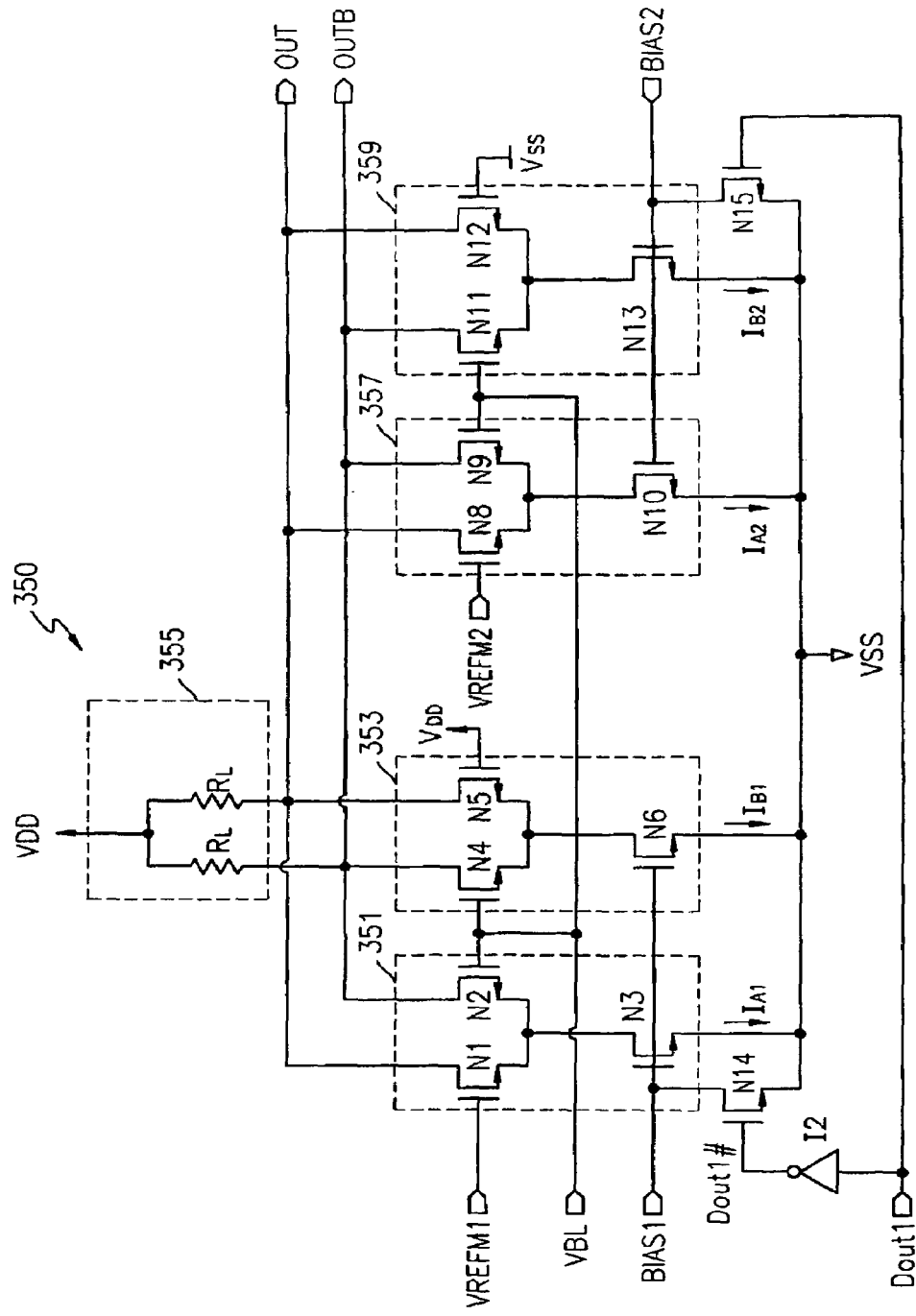
FIG. 11 shows an alternate embodiment of a receiver circuit.

FIG. 11 illustrates a circuit diagram for one embodiment of receiver 350 of FIG. 6, which accepts four reference voltages $V_{DD}$, $V_{SS}$, VREFM1, and VREFM2. Instead of the FIG. 4/FIG. 7 approach of multiplexing two reference voltages to the same transistor gate (transistor N5), each reference voltage in FIG. 11 is supplied to the gate of its own transistor in its own differential amplifier. Different differential amplifiers are activated and deactivated depending on the state of Dout1.

Receiver 350 contains a load circuit 355 and differential amplifiers 351 like the corresponding circuits in receiver 150. In receiver 350, however, VREFM1 is applied to the gate of N1 and $V_{DD}$ is applied to the gate of N5, since these are the two comparison voltages to be used when Dout1 is a logic high value.

A control voltage BIAS1 is applied to tail current transistors N3 and N6, causing them to generate matching tail currents $I_{A1}$ and $I_{B1}$, respectively. BIAS1 can be shorted to ground through a transistor N14, however, causing transistors N3 and N6 to turn off. The logic signal Dout1 is applied to the input of an inverter 12 to produce the logical inverse of Dout1, Dout1#. Dout1# is applied to the gate of transistor N14, such that N14 remains off when Dout1 is in a logic high state (time periods T1 and T2 of FIG. 7A), causing differential amplifiers 351 and 353 to perform comparisons as previously described for amplifiers 151 and 153 of FIG. 8. When Dout1 is in a logic low state, however, (time periods T3 and T4 of FIG. 7A), Dout1# activates N14 to turn off current flow through differential amplifiers 351 and 353.

Receiver 350 includes a duplicate set of differential amplifiers 357 and 359, which are activated when differential amplifiers 351 and 353 are deactivated, and vice versa. Differential amplifier 357 contains a matched differential transistor pair N8 and N9 and a current source transistor N1. Transistor N8 receives a gate voltage VREFM2. Transistor N9 receives a gate voltage $V_{BL}$. Preferably, transistors N8 and N9 are matched to transistors N1 and N2 as well, although this is not strictly necessary.

Differential amplifier 359 contains a matched differential transistor pair N11 and N12 and a current source transistor N13. Transistor N11 receives a gate voltage $V_{BL}$. Transistor N12 receives a gate voltage $V_{SS}$. Preferably, transistors N11 and N12 are matched to transistors N4 and N5 as well, although this is not strictly necessary.

A control voltage BIAS2 is applied to tail current transistors N10 and N13, causing them to generate matching tail currents $I_{A2}$ and $I_{B2}$, respectively. Preferably, BIAS1=BIAS2 and N10, N13 are matched to N3, N6, such that $I_{A2}$ and $I_{B2}$ have the same magnitude as $I_{A1}$ and $I_{B1}$ when activated. BIAS2 can be shorted to ground through a transistor N15, causing transistors N10 and N13 to turn off. Dout1 is applied to the gate of transistor N15, such that N15 remains off when Dout1 is in a logic low state (time periods T3 and T4 of FIG. 7A), causing differential amplifiers 357 and 359 to perform comparisons as previously described for amplifiers 151 and 153 of FIG. 8. When Dout1 is in a logic high state, however, (time periods T1 and T2 of FIG. 7A), Dout1 activates N15 to turn off current flow through differential amplifiers 357 and 359.

BIAS1 and BIAS2 can be supplied from individual bias circuits. In the alternative, BIAS1 and BIAS2 can be supplied from a common BIAS circuit that connects to BIAS1 and BIAS2 through pass transistors (not shown) that disconnect BIAS1 or BIAS2 from BIAS when BIAS1 or BIAS2 will be shorted to ground.

Figure 12:
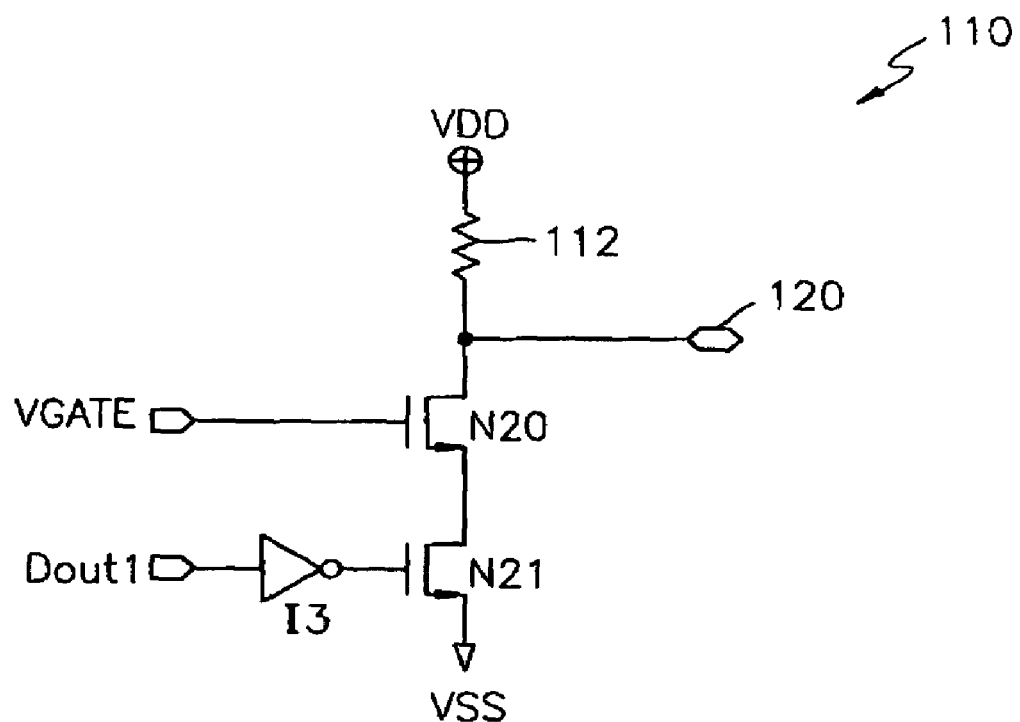
FIG. 12 illustrates a driver circuit useful in at least some embodiments of the present invention.

Inverter-type drivers can be used in each of the described embodiments. FIG. 12 shows a circuit diagram for an alternate embodiment of driver 110. Driver 110 connects a resistor 112 between $V_{DD}$ and output node 120. Output node 120 is also connected to $V_{SS}$ through a serial combination of two n-channel transistors N20 and N21. N20 receives a gate voltage VGATE, e.g., fixed at $V_{DD}/2$. N21 receives as its gate voltage the output of an inverter 13, which has its input connected to Dout1. When Dout1 is at a logic high value, transistor N21 is turned off and node 120 is pulled up through resistor 112. When Dout1 is at a logic low value, transistor N21 is turned on and node 120 is also pulled down through transistors N20 and N21. Driver 110 has a small input capacitance as compared to an inverter-type driver.

Those skilled in the art will recognize that many other device configuration permutations can be envisioned and many design parameters have not been discussed. For example, the circuit of FIG. 11 could be adapted to a three-reference voltage system with only one midpoint voltage by using three differential amplifiers and having the one receiving the midpoint voltage unswitched. Or, reference selector 130 of FIG. 4 could be adapted to multiplex two midpoint voltages, allowing the receiver of FIG. 8 to be used in the system of FIG. 6. Specific voltages, resistance values, transistor sizes, etc., have not been specified as these will change from application to application. Likewise, functionality shown embodied in a single functional block may be implemented using multiple cooperating circuits or blocks, or vice versa. The integrated circuits described can be any type of circuit that inputs digital data from and sends digital data to another circuit, e.g., a microprocessor or other programmable processor, a memory controller, a memory device, a serializer/deserializer, etc. Such minor modifications and implementation details are encompassed within the embodiments of the invention, and are intended to fall within the scope of the claims.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

What is claimed is:

1. An integrated circuit having a simultaneous bi-directional (SBD) input/output circuit, the SBD input/output circuit comprising:
    a driver to drive an SBD transmission line in response to a driver input signal;
    a receiver to compare a first voltage on the SBD transmission line to first and second reference voltages, and to output to the integrated circuit an input signal that depends upon the result of the comparison; and
    reference selection circuitry to control at least one of the first and second reference voltages used by the receiver in response to the driver input signal, wherein the receiver comprises first and second differential amplifiers connected to a common output node, each differential amplifier having first and second input nodes, the first input node of each differential amplifier connected to the transmission line, the second input node of the first differential amplifier connected to the first reference voltage, the second input node of the second differential amplifier connected to the second reference voltage.

2. The integrated circuit of claim 1, wherein the common output node comprises first and second differential output nodes, the receiver further comprising first and second matched load resistors, the first load resistor connected between a first supply voltage and the first differential output node, the second load resistor connected between the first supply voltage and the second differential output node, and wherein each differential amplifier comprises:
    current source to generate a tail current at a tail node;
    first field-effect transistor having a gate connected to the first input node, a drain connected to the first differential output node, and a source connected to the tail current node; and
    second field-effect transistor, matched to the first field-effect transistor, the second field-effect transistor having a gate connected to the second input node, a drain connected to the second differential output node, and a source connected to the tail current node.

3. The integrated circuit of claim 2, wherein the first and second differential amplifier current sources are matched to each other.

4. The integrated circuit of claim 3, wherein the first and second field-effect of transistors the first and second differential amplifiers are matched to each other.

5. The integrated circuit of claim 1, wherein the reference selection circuitry comprises a reference generator to generate the second reference voltage, the reference generator selling the second reference voltage to a high voltage when the driver input signal is a logic high voltage and setting the second reference voltage to a low voltage when the driver input signal is a logic low voltage.

6. The integrated circuit of claim 5, the reference generator comprising:
    first and second complementary pass transistors having gates coupled to a common input node that receives the driver input signal, the first pass transistor passing a low voltage to an output node when activated, the second pass transistor passing a high voltage to the output node when activated.

7. The integrated circuit of claim 6, the first pass transistor having a drain connected to the second reference voltage that approximates the low voltage, the second pass transistor having a drain connected to the second reference voltage that approximates the high voltage minus the threshold voltage of the second pass transistor.

8. The integrated circuit of claim 5, the reference generator comprising:
    first and second transmission gates having a common output node and coupled to a common input node that receives the driver input signal such that when the driver input signal is a logic low voltage the first transmission gate is activated and when the driver input signal is a logic high voltage the second transmission gate is activated, the first transmission gate having an input connected to a low reference voltage, the second transmission gate having an input connected to a high reference voltage.

9. The integrated circuit of claim 5, wherein the reference selection circuitry further comprises a mid-voltage generator to generate the first reference voltage as a voltage midway between a high voltage and a low voltage.

10. The integrated circuit of claim 9, wherein the mid-voltage generator also generates the first reference voltage for other SBD circuits on the same integrated circuit.

11. The integrated circuit of claim 9, wherein the mid-voltage generator also exports the first reference voltage to a second integrated circuit connected to the transmission line.

12. The integrated circuit of claim 5, wherein the reference supply circuitry comprises a circuit input pad to receive the first reference voltage from an external reference.

13. The integrated circuit of claim 1, wherein the transmission line is integrated on the integrated circuit, and wherein the SBD input/output circuit communicates with another SBD input/output circuit on the same integrated circuit across the transmission line.

14. The integrated circuit of claim 1, wherein the driver comprises a resistor connected between a first supply voltage and an SBD transmission line terminal, a first transistor having a drain connected to the SBD transmission line terminal and a source connected to the drain of a second transistor, the second transistor having a source connected to a second supply voltage, wherein the gate of the first transistor receives a voltage signal approximately midway between the first and second supply voltages, and wherein the gate of the second transistor is controlled by the driver input signal.

15. An integrated circuit having a simultaneous bi-directional (SBD) input/output circuit, the SBD input/output circuit comprising:

a driver to drive an SBD transmission line in response to a driver input signal;

a receiver to compare a first voltage on the SBD transmission line to at least one of first and second reference voltages, and to output to the integrated circuit an input signal that depends upon the result of the comparison;

midpoint voltage generation circuitry that, when connected with similar circuitry on a second integrated circuit, generates a first midpoint voltage that approximates the voltage on the SBD transmission line when the driver is driving a logic high signal and a driver on the second integrated circuit is driving a logic low signal on the SBD transmission line, and generates a second midpoint voltage that approximates the voltage on the SBD transmission line when the driver is driving a logic low signal and the driver on the second integrated circuit is driving a logic high signal on the SBD transmission line; and reference selection circuitry that selects the first midpoint voltage as the first reference voltage when the driver input signal is set to cause the driver to drive a logic high signal, and selects the second midpoint voltage as the first reference voltage when the driver input signal is set to cause the driver to drive a logic low signal.

16. The integrated circuit of claim 15, wherein the midpoint voltage generation circuitry comprises a first drive circuit having an output terminal where the first midpoint voltage exists and a second drive circuit having an output terminal where the second midpoint voltage exists, the first and second drive circuits matched respectively to the driver when driving a logic high signal and logic low signal.

17. The integrated circuit of claim 15, wherein the receiver receives the first midpoint voltage as an input to one transistor of a first differential transistor pair and receive the second midpoint voltage as an input to one transistor of a second differential transistor pair, and wherein the reference selection circuitry selectively activates one of the differential transistor pairs and deactivates the other differential transistor pair to select which of the midpoint voltages will be compared to the first voltage on the SBD transmission line.

18. A method of decoding remotely signaled data from a voltage of a simultaneous bi-directional (SBD) transmission line, the method comprising:

supplying a first reference voltage to a receiver, the first reference voltage having a predetermined voltage between a first voltage and a second voltage, wherein supplying the first reference voltage comprises supplying a voltage midway between a logic high voltage and a logic low voltage;

supplying a second reference voltage to the receiver, the second reference voltage selected from the first voltage and the second voltage in response to an input signal;

supplying the voltage on the SBD transmission line to the receiver, the voltage on the SBD transmission line selected from among the first voltage, the second voltage, and a midpoint voltage between the first and the second voltage;

comparing the voltage on the SBD transmission line to the first and second reference voltages; and outputting, based on the comparison, a data signal representing the logic state of the remotely signaled data.

19. The method of claim 18, wherein comparing the voltage on the SBD transmission line to the first and second reference voltages comprises:

supplying the first reference voltage and the voltage on the SBD transmission line as inputs to a first differential transistor pair sharing a first tail current supplying the second reference voltage and the voltage on the SBD transmission line as inputs to a second differential transistor pair sharing a second tail current; and driving a common load pair from both the first and second differential transistor pairs, such that a differential voltage taken across the load pair represents the result of both comparisons.

20. The method of claim 18, wherein supplying the second reference voltage comprises setting the second reference voltage to a high voltage when the locally signaled data is logic high and setting the second reference voltage to a low voltage when the locally signaled data is logic low.

21. The method of claim 18, wherein supplying a voltage midway between a logic high voltage and a logic low voltage comprises:

generating a first midpoint voltage representative of the voltage on the SBD transmission line that would be expected when the remotely signaled data has a low logic state and the locally signaled data has a high logic state;

generating a second midpoint voltage representative of the voltage on the SBD transmission line that would be expected when the remotely signaled data has a high logic state and the locally signaled data has a low logic state; and supplying the first midpoint voltage as the voltage midway between when the logic state of the locally signaled data is high, and supplying the second midpoint voltage as the voltage midway between when the logic state of the locally signaled data is low.

* * * * *

UNITED STATES PATENT AND TRADEMARK OFFICE
CERTIFICATE OF CORRECTION

PATENT NO. : 6,972,597 B2
APPLICATION NO. : 10/748748
DATED : December 6, 2005
INVENTOR(S) : Kim It is certified that error appears in the above-identified patent and that said Letters Patent is hereby corrected as shown below:

At column 1, line 61 replace "$V_1$" with --$V_\ell$--
At column 1, line 63, replace "$V_1$" with --$V_\ell$--
At column 1, line 65 replace "$V_1$" with --$V_\ell$--
At column 8, line 3 replace "12" with --I2--
At column 8, line 16 replace "N1." with --N10.--
At column 8, line 55 replace "13" with --I3--
At column 9, line 66 replace "field-effect of transistors" with --field-effect transistors of--
At column 11, line 34 replace "receive the" with --receives the--
At column 12, line 16 replace "current supplying" with --current; supplying--

Signed and Sealed this

Eighth Day of May, 2007

JON W. DUDAS
*Director of the United States Patent and Trademark Office*